(No Model.) 2 Sheets—Sheet 2.

G. BRINCKMAN & F. WIEDERHOLDT.
FILTER.

No. 550,583. Patented Dec. 3, 1895.

UNITED STATES PATENT OFFICE.

GEORGE BRINCKMAN AND FERDINAND WIEDERHOLDT, OF ST. LOUIS, MISSOURI, ASSIGNORS OF ONE-FOURTH TO BERTHA BRINCKMAN, OF SAME PLACE; SAID GEORGE BRINCKMAN ASSIGNOR OF ONE-EIGHTH TO SAID WIEDERHOLDT.

FILTER.

SPECIFICATION forming part of Letters Patent No. 550,583, dated December 3, 1895.

Application filed April 6, 1894. Serial No. 506,612. (No model.)

*To all whom it may concern:*

Be it known that we, GEORGE BRINCKMAN, a subject of the Emperor of Germany, and FERDINAND WIEDERHOLDT, a citizen of the United States, residing at the city of St. Louis, State of Missouri, have invented a certain new and useful Improvement in Filters, of which the following is a full, clear, and exact description, reference being had to the accompanying drawings, forming part of this specification, wherein like letters of reference refer to like parts, and in which—

Figure 1:
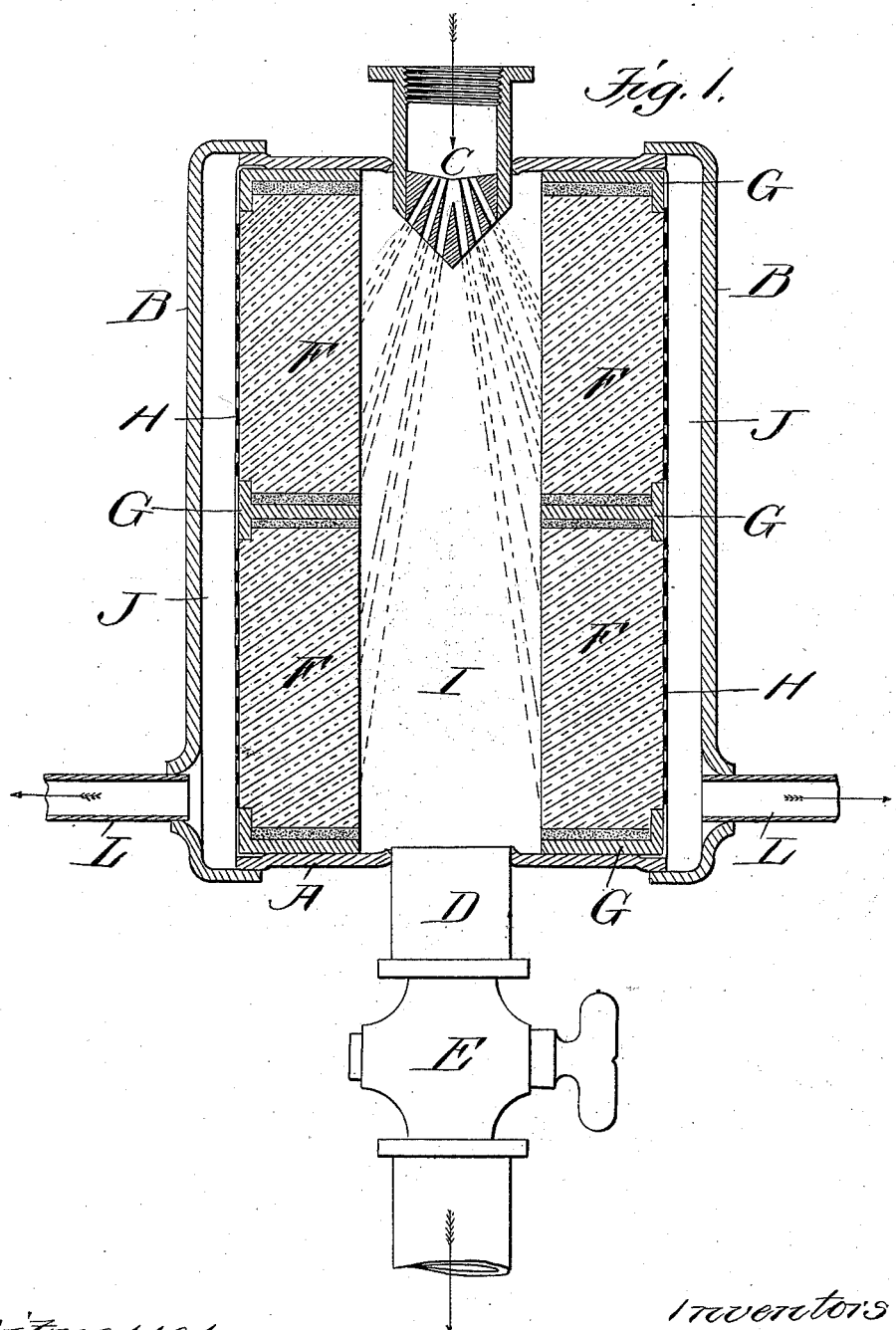
Figure 2:
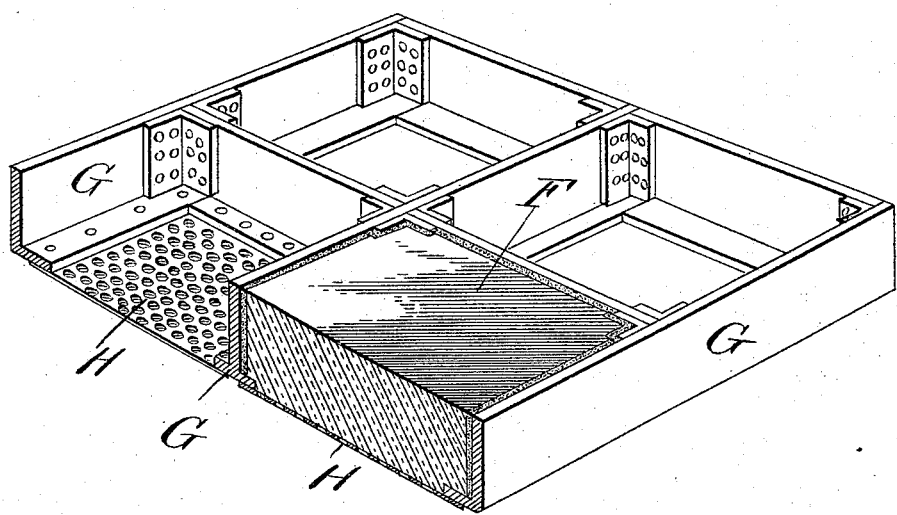

Figure 1 is a sectional view of our improved filter, and Fig. 2 is a detail view of the filtering material and its supporting-frame.

Our invention relates to a new and useful improvement in filters; and it consists, generally stated, in arranging the same in the length of a pipe, thus enabling the water or other fluid to pass through the casing without being filtered, which is desirable in some cases, and in locating to the side or sides of said straightway suitable filtering material through which the water or other fluid may percolate under pressure and be received into a chamber located beyond, from which it may be drawn.

Another feature resides in the peculiar construction and arrangement of the filtering material in a frame, whereby a large filtering-surface may be obtained by arranging side by side filtering-stones of such thickness as will enable the water to percolate through them readily.

Other minor features of invention reside in the peculiar construction, arrangement, and combination of the parts, all as will hereinafter be more fully described, and afterward pointed out in the claim.

In the drawings, A indicates a casing, which may be of any suitable size and shape, at the end of which are arranged caps or end walls B. Extending into the top of the casing is an inlet-pipe, which terminates in a nozzle C, which nozzle is preferably perforated, as shown, to direct the inflowing water against the filtering-surface.

The pipe D leads from the bottom of the casing, in which pipe is preferably mounted a stop-cock E.

The filtering material is preferably formed in separate sections or slabs, which are cemented or otherwise received into a suitable framework G. This framework, as shown, is preferably made of L and T beams, against the flanges of which rest the filtering-slabs F, while between the filtering-slabs and the webs of the frame is received a suitable cementing material for holding the filtering-slab in place.

In order to resist the pressure of the water which would have a tendency to bulge the filtering-slabs at their middle, we secure to the outer face of the frame and filtering material the perforated plate H, which may be made of one or more pieces, as desired.

The operation of the device is as follows: The water flowing in at pipe C, assuming that stop-cock E is closed, will fill the chamber I between the filtering material and percolate through said filtering material into the chambers J, whence it may be drawn through pipes L, or it may flow from chambers J into some suitable receptacle or reservoir. (Not shown.) If it is desired to get an uninterrupted but unfiltered flow of water through the pipe D, stop-cock E is turned so as to open said pipe, which will empty chamber I, and the water flowing through the nozzle C will be directed against the filtering-surface, so as to cleanse the same, whence it will flow through pipe D.

We are aware that many minor changes in the construction, arrangement, and combination of the parts of our device can be made and substituted for those herein shown and described without in the least departing from the nature and principle of our invention.

Having thus described our invention, what we claim, and desire to secure by Letters Patent, is—

In a filter, the combination with a casing having an inlet pipe opening into its upper end, and an outlet pipe leading from its lower portion, which last is controlled by a cock, of spider-frames mounted in the ends of the casing, filtering material which is cemented in said frames, perforated plates arranged on the outer faces of the filtering material, and caps on the ends of the casing, which form chambers for the filtered fluid; substantially as described.

In testimony whereof we hereunto affix our signatures, in presence of two witnesses, this 3d day of April, 1894.

GEORGE BRINCKMAN.
FERDINAND WIEDERHOLDT.

Witnesses:
F. R. CORNWALL,
HUGH K. WAGNER.